3,021,191
PRUSSIAN BLUE PIGMENT
William H. Rhodes, Huntington, W. Va., assignor to Standard Ultramarine & Color Co., Huntington, W. Va., a corporation of West Virginia
No Drawing. Filed June 9, 1958, Ser. No. 740,578
5 Claims. (Cl. 23—77)

This invention relates to the manufacture of Prussian Blue pigments and more particularly to the manufacture of Prussian Blue pigments by an improved oxidative process, the product thereof being characterized by enhanced color strength and by greatly improved dispersibility in various suspension media without the formation of the agglomerates and grit particles characterizing prior art processes.

Two methods heretofore have been utilized in the manufacture of ferric ferrocyanide pigments, viz., the direct and the indirect methods. The direct method involves a process in which soluble ferric salts such as the sulfate or chloride are combined with potassium ferrocyanide. Blues produced by the direct process, though easier to produce, are practically never used since they are characterized by colors much inferior to those produced by the indirect method.

In the manufacture of iron blues by the indirect method as heretofore practiced, solutions of an alkali or ammonium ferrocyanide and a soluble ferrous salt, usually ferrous sulfate, are reacted to produce as a bluish-white complex ferrous ferrocyanide (Berlin White). This product is then washed as by decantation to form a slurry. This slurry containing the complex pigment is then partially oxidized with oxidizing agents such as dichromates, chlorates and chlorine and oxygen. After the oxidation, the product may be washed several times (as by decantation and filtering) until sufficiently free of impurities, and then filter-pressed to form a press cake. The press cake is then broken up and dried in circulating-type ovens to effect removal of water. During the drying operation, further oxidation of the partially oxidized complex ferrous ferrocyanide to a complex ferric ferrocyanide is accomplished by means of atmospheric oxygen, thus producing a pigment possessing the desired color of Prussian Blue. (The term "Prussian Blue" as used in this specification refers to a complex iron ferrocyanide pigment which contains iron in both the ferrous and ferric states and is characterized by a rich blue color with red shades and overtones.)

In the prior art process the drying operation has been found essential to production of a satisfactory pigment since the oxidizing agents heretofore used to accomplish the preliminary oxidation in solution are not capable of forming a product oxidized to the desired shade and color strength. Since in this prior process the final oxidation is dependent on oxidation by atmospheric oxygen at the elevated temperatures, the degree of pulverization of the press cake has been found important. Varying degrees of difficulty have been experienced in grinding the press cake depending on its moisture content. Thus a more finely ground pulverant material will be oxidized at a faster rate than one that is more coarse, due to the higher surface area of the solid exposed to the atmosphere.

As produced by prior processes, Prussian Blue pigments have undergone undesired aggregation, particularly during the drying operation where cementation of the particles has taken place. Formation of aggregates renders the pigment difficult to grind into a smooth paste with oil or other vehicles. Moreover, if a drying oil is used in the grinding operation, oxidative reaction with the pigment is liable to occur with the resultant formation of a gelatinous mass which also is difficult to grind. The breaking down of the aggregates formed by prior processes to reach the desired degree of dispersion and freedom from grit in a solvent vehicle usually has been effected by dry grinding the pigment to a fine powder and then the incorporation or grinding of the pigment into the vehicle. Each of these steps requires expenditure of labor and energy.

Moreover, if an attempt is made to flush the partly oxidized pigment obtained by oxidation with the chlorates, dichromates, chlorine, oxygen or other oxidant employed by the prior art into a printing ink formulation, the ink produced is considerably weaker and lacking in color value when compared to a similar ink produced from a pigment which first has been oxidized by drying and then ground in the usual prior art manner. This result is due to the presence of predominate amounts of the less strongly colored ferrous ferrocyanide in the pigment mixtures which have not undergone air oxidation.

In view of these and other deficiencies in the prior art, it is a primary object of this invention to provide an improved method for oxidizing ferrous ferrocyanide pigments to obtain a Prussian Blue pigment of high color strength.

It is a more specific object of this invention to provide a method for the production of a satisfactory Prussian Blue pigment which does not produce the aggregates and grit requiring the utilization of expensive and time-consuming drying or grinding operations.

It is an additional object of this invention to provide a process for the production of satisfactory Prussian Blues wherein direct pigment flushing and water dispersion techniques may be applied.

It is yet a further object of the invention to provide an economical method for imparting a satisfactory red toner blue color to ferrous ferrocyanide pigments which method can be completed in a materially shorter period of time than in conventional processes for achieving a like result.

It is also an important object of the invention to provide a novel process effective in either one or more stages to oxidize ferrous ferrocyanide pigments to Prussian Blues appropriate to ink and paint manufacture.

It is still a further object of this invention to provide a method for oxidizing a complex ferrous ferrocyanide pigment structure to the completely oxidized ferric ferrocyanide in the slurry stage of the oxidation, so that no drying operation is necessary to achieve the maximum color development.

It is further an important specific object of this invention to provide a novel two-stage process effective to impart the red tone to Prussian Blue pigments desired for ink or dye manufacture.

The foregoing and related objects may be attained in accordance with the present invention by oxidizing a complex ferrous ferrocyanide pigment with hydrogen peroxide. Hydrogen peroxide may be employed as the sole oxidizing agent in a one-stage process or the complex ferrous ferrocyanide may be initially partially oxidized by such oxidants as alkali metal dichromates, chlorine or oxygen and then, in a second stage, oxidized with hydrogen peroxide to form a complex ferric ferrocyanide pigment possessing the desired color characteristics of Prussian Blue. The ferric ferrocyanide pigment so produced may be directly flushed into a coating composition without the air drying or grinding steps deemed essential by the prior art in producing and incorporating iron blue pigments in coating compositions.

More specifically, it has been discovered that hydrogen peroxide is peculiarly effective in oxidizing a ferrous ferrocyanide pigment to the complex ferric ferrocyanide structure representative of Prussian Blue pigments. In accordance with one embodiment of the invention, an aqueous slurry of ferrous ferrocyanide is oxidized with a solution of hydrogen peroxide in one stage to produce a slurry of Prussian Blue adaptable in strength and color content in the tinting of various inks and dyes. This slurry either may be filtered at this time or flushed directly into an ink solution. If the slurry is first filtered, then the finely divided precipitate may subsequently be flushed into an ink composition. Filtration at this stage will be determined by the grade of ink desired to be produced and storage problems. For instance, it will be readily appreciated that a dry precipitate can more readily be stored than a slurry.

In accordance with a further specific embodiment of the invention a preliminary oxidation of ferrous ferrocyanide is conducted in an aqueous slurry with any of the well-known oxidants theretofore used in the oxidative process for producing Prussian Blues, filtering to form a press cake, slurrying the press cake in an aqueous medium and subsequently completing oxidation with a solution of hydrogen peroxide. The filtration of the preliminary oxidation product may be omitted and the hydrogen peroxide added directly to the slurry resulting from the preliminary oxidation. The slurry of the ferric ferrocyanide pigment thereby produced may be employed directly in making coating compositions or it may be filtered and used in the same manner as set forth in the one-stage process.

Pursuant to this invention, aqueous solutions of hydrogen peroxide may be used in any concentration; however, the commercially available concentrations of 10–65% are preferred. Above a concentration of sixty-five percent, hydrogen peroxide becomes explosive in character and presents special handling problems whereas below ten percent, the period of oxidation is unduly protracted. The hydrogen peroxide should be used in an amount which is at least seventy-five percent of the stoichiometric amount necessary for the oxidation of the divalent iron present in the form of an independent cation in its salts to the tripositive oxidation state. By independent cationic iron is meant iron other than that which is associated with cyanide ions. Amounts of hydrogen peroxide in excess of the stoichiometric proportion may be employed without adverse effect. One of the several advantages of the present invention lies in the fact that no solid residue is produced after oxidation with hydrogen peroxide and while use of excessive amounts of this oxidant may be uneconomical, the excess merely volatilizes without any adverse effect whatsoever.

The conventional oxidants utilized by the prior art for oxidizing ferrous ferrocyanide may be employed in the initial oxidation step of the two-stage oxidatoin process in accordance with one embodiment of this invention. Such oxidizing agents include, without limitation, alkali metal dichromates, alkali metal hypochlorites, alkali metal chlorites, alkali metal chlorates and perchlorates, alkali metal manganates and permanganates, chlorine, chlorine dioxide, oxygen and the like. Alkali metal dichromates, alkali metal chlorates and chlorine gas are preferred.

The hydrogen peroxide oxidant of the present invention exhibits surprising oxidizing properties which are not apparent from the prior art. During the development of the novel Prussian Blues of this invention, other oxidants were unsuccessfully used in varying concentration. For example, it was found that even large excesses of such preferred prior art oxidants as sodium dichromate, sodium chlorate and chlorine were ineffective in a one-stage oxidation process, the pigments produced lacking the desired, fully developed Prussian Blue shade and strength. Such pigments were clearly inferior to those prepared by the initial wet oxidation and subsequent air oxidation and grinding techniques now standard in the art. Furthermore, when the oxidizing strength of the dichromate was varied by effecting a change in the pH of the solution, similar results were obtained.

It was theorized that perhaps further oxidation might be effected with a dichromate solution if the oxidation was performed in a two-stage process. Thus after an initial oxidation of the ferrous ferrocyanide pigment with the dichromate solution, the slurry was filtered to form a press cake. In this manner any salts and by-products produced by the initial oxidation that might possibly interfere in producing the fully oxidized pigment are removed. The press cake was then reslurried and oxidized further with an additional charge of the dichromate solution. The pigment produced by this two-stage process possessed slightly improved color characteristics to that produced in the one-stage process, but was still unsatisfactorily weak in color as compared with that produced by the prior art process employing a final air drying step.

Due to the complex structure of iron cyanides, the exact mechanism whereby oxidation takes place is not definitely known. The chemical formulae usually written for the intermediate ferrous ferrocyanide is

whereas that for Prussian Blue is

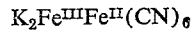

These molecules exist in a complex three dimensional structure wherein it is assumed that the cyanide group can coordinate through the nitrogen atom of the cyanide group as well as the carbon atom, in effect forming a "supercomplex." The Prussian Blue structure possesses a cubic lattice wherein the iron atoms are alternately disposed along the corners of a cube and a unipositive ion is inserted in alternate unit cells to preserve the charge structure. Ferrous ferrocyanide similarly possesses a cubic structure with the ferric iron being replaced by ferrous iron and possessing unipositive ions in each cube. Therefore, the color of the complex formed in converting the ferrous ferrocyanide to ferric ferrocyanide will depend on the properties of the particular oxidant in effecting a change in this complex structure by oxidizing the ferrous iron to ferric and the ability of the treating solution to remove the unipositive ions which may be considered to be embodied in a cage-like structure, i.e., a clathrate. Due to the complex nature of the structure of Prussian Blue pigments, oxidizing or reducing agents must be considered individually with regard to their ability to either oxidize or reduce the iron atoms. For instance in the formation of Prussian Blue from ferric ferricyanide, the ferric ferricyanide may be reduced with sulfur dioxide to the ferric ferrocyanide structure. However, when sulfur dioxide is used separately to reduce solutions of ferric iron and ferricyanides, it has been found that it reduces the ferric iron but not the ferricyanides. Even more surprising is the fact that again in reducing Berlin Green (ferric ferricyanide) to Prussian Blue, hydrogen peroxide may be used as a reducing agent. Hydrogen peroxide is a known reducing agent for ferricyanides but will not reduce ferric iron. Thus in accomplishing the same reduction by two well-known reducing agents, the mechanisms of reaction are necessarily different, since on the one hand, sulfur dioxide is capable of reducing ferric iron but not ferricyanides while with hydrogen peroxide the converse is the case, viz., it reduces ferricyanides but not ferric iron.

In the present invention hydrogen peroxide is being employed to oxidize ferrous iron to the ferric state. Although the exact mechanism involved in the oxidation is not fully understood, it may be postulated that the reaction proceeds by the ferrous iron catalyzing the reduction of hydrogen peroxide to form ferric iron, hydroxyl ions and hydroxyl radicals. The hydroxyl radicals have only a transitory existence and being very potent oxidizing agents, can further oxidize a molecule of ferrous iron. In effect, one molecule of hydrogen peroxide oxidizes two molecules of iron. The overall reaction then may be shown by the following equations:

$Fe^{++} + H_2O_2 \rightarrow Fe^{+++} + OH^- + OH$ (hydroxyl radical)
$Fe^{++} + OH \rightarrow Fe^{+++} + OH^-$ In the formation of Prussian Blue pigments in accordance with the invention, the amount and concentrations of hydrogen peroxide used to give the enhanced color characteristics may vary with the time the oxidation is carried out, the temperature used, and the degree to which the Berlin White pigment previously has been oxidized with oxidizing agents such as sodium dichromate, sodium chlorate and chlorine gas. While the temperature used may be either above or below room temperature, it is preferred to carry out the reaction at room temperature.

As indicated, in going from the ferrous ferrocyanide to the ferric ferrocyanide structure, it is necessary to remove unipositive ions from the cubic ferrous ferrocyanide structure. Hence it is undesirable to introduce any additional unipositive ions into the solution when effecting the desired final oxidation, since such ions appear to prevent the diffusion of the unipositive ions in the clathrate into solution. Accordingly, it was found that where the final peroxide oxidation was attempted with acidified solutions of alkali and alkaline earth metal peroxides, the improved Prussian Blue pigments were not formed, the results being similar to those attained when the oxidation was carried out by employing a two-stage oxidation with sodium dichromate.

The degree to which the unipositive ions are removed appears to affect the resonance properties of the ferrous and ferric iron in the crystal lattice. Thus it is postulated that when the iron is in both the divalent and trivalent oxidation states there is a possible resonance between the two ions in which, in simplified terms, the two valencies may be regarded as changing places. This resonating effect apparently causes an intense and very selective absorption of light. When both the iron atoms are divalent or both trivalent, this selective absorption is not obtained and the desired brilliant color is not formed. When more than the theoretical number of unipositive ions remain in the lattice structure; then the color properties are also changed due to modification of the particular resonance structures obtained. It has been found that the particular shade of blue obtained depends both on the degree of the oxidation of the ferrous iron to the ferric and the effective elimination of excess unipositive ions from the lattice structure.

As indicated, the slurry produced after the final peroxide oxidation may be flushed directly into ink or dye compositions. Any one of the numerous flushing agents described in the proir art for indirectly flushing Prussian Blues can be effectively utilized with the novel Prussian Blues produced by the peroxidic oxidation of this invention. Flushing agents which are particularly preferred include mineral oils, litho-varnishes, and synthetic oil formulations. Preferred flushing agents are naphthenic base mineral oils modified with resinous materials such as ester gum.

In flushing the pigment into the flushing media, it is preferred to use a flushing aid to increase the ease and rate of dispersion of the pigment in the flushing media. Any of the commonly employed flushing aids are operable. However, it is preferred to use quaternary salts of amine bases such as alkyl pyridinium chlorides.

It has been found that an over dispersion of the pigment during oxidation sometimes causes a noticeable weakening in color. This effect can be obviated and the color brought to the desired strength by addition of 2-octanol to the slurry before the start of the hydrogen peroxide oxidation. Capryl alcohol may be employed in amounts of .1–10%, preferably from .5–5%, based on the amount of ferrous ferrocyanide pigment in the slurry.

In flushing the pigment into a finished ink composition, it is desirable to incorporate a minor amount of an anionic surface active agent. Appropriate anionic surfactants include, without limitation, alkali and metallic soaps, such as sodium oleate, potassium stearate, magnesium stearate, zinc naphthenate, lead oleate, etc.; water-soluble organic amine compounds linked with fatty acids, such as triethanolamine oleate, diethanolamine stearate, or monoethanolamine laurate and the like; sulfonated compounds, such as sodium lauryl sulfate, sulfonated castor oil, dodecyl benzene sulfonate, sodium alkyl sulfonate, alkaryl sulfonates and the like.

It is also desirable to incorporate an anti-oxidant in the finished ink composition to prevent any body deterioration of the ink. While any of the anti-oxidants normally used in Prussian Blue pigments may be employed, it is preferred to use 2,6-di-tert-butyl-4-methylphenol or similar types of hindered phenols.

Without limiting my invention, the following examples are given to illustrate my preferred mode of operation. For the convenience of those desiring to practice my invention, the process is described both on a laboratory and a plant scale.

*Example I*

One hundred thirty-four and two tenths parts of sodium ferrocyanide ($Na_4Fe(CN)_6 \cdot 10H_2O$), and 18.3 parts of ammonium sulfate ($(NH_4)_2SO_4$ were dissolved in 2500 parts of water at 30° C. in a four liter beaker equipped with a T-shaped agitator. To this solution there was added during a thirty minute period a solution composed of the following: 103.2 parts of ferrous sulfate $$(FeSO_4 \cdot 7H_2O)$$

(trivalent iron 0.22% of total iron) and 18.3 parts of concentrated sulfuric acid (93% $H_2SO_4$) dissolved in 1250 parts of water at 30° C.

This solution was added with agitator operating at a speed of about 90 r.p.m.

The resultant "white precipitate" or "Berlin White" slurry (ferrous ferrocyanide complex) was diluted with water at 35° C. to three times its volume and allowed to settle for forty-eight hours.

The clear water was then drawn off from the settled pigment and the slurry was again placed in the four liter beaker, equipped as above. 12.2 parts of ammonium sulfate, dissolved in a small amount of water was added to the slurry. The slurry was stirred one-half hour and the pH adjusted to approximately 9.0 with aqua ammonia. This slurry was stirred two hours.

After this, 3.3 parts of sodium bichromate ($Na_2Cr_2O_7$), dissolved in a small amount of water was added to the slurry. This slurry was stirred two hours. This product was then filtered to form a press cake and washed on a Büchner funnel.

*Example II*

Example I was repeated to form a press cake. The press cake was dried on open trays in an oven. It was then pulverized to form a dry pigment.

*Example III*

The dry content of the press cake of Example I was determined and a sample equal to 25.0 parts of dry pigment was flushed on a 4 x 12 inch three-roll mill. The flushing composition comprised:

25.0 parts pigment (dry basis) (40.0%)
2.50 parts flushing aid (4.0%)
34.80 parts naphthenic base mineral oil and ester gum resin mineral oil vehicle (55.8%)
0.20 parts of anti-oxidant

*Example IV*

As a control, 25.0 parts of the air oxidized pigment of Example II was ground three passes on a 4 x 12 inch three-roll mill in the vehicle combination of Example III to form a dry color ink.

*Example V*

The finished inks of Examples III and IV were tinted in 50:1 ratio in a tinting bleach formulation which comprised:

100 parts of titanium dioxide ($TiO_2$)
320 parts barium sulfate (blanc fixe)
130 parts clear varnish
20 parts of manganese drier (the manganese salt of naphthenic acid)

*Example VI*

Strength determinations of the ink compositions of Example V were made on a bleach cut basis. In this determination a standard ink is used as a base and the strength of the ink undergoing test is determined by the amount of bleach required to bleach out the sample as compared with the standard. For example, an ink 50% strong would require 150 parts of bleach to reach the strength level of the standard ink requiring 100 parts of bleach.

The ink produced by directly flushing the press cake of Example I, as in Example III, and tinted as in Example V, was used as standard. When the air oxidized pigment of Example II, dry ground into an ink formulation as in Example IV and tinted as in Example V was compared to this standard, it exhibited a strength advantage of 105%. This test illustrates the relatively low strength characterizing pigments produced solely by dichromate oxidation and flushed directly from press cake into an ink composition.

*Example VII*

A 100 part sample of the press cake produced as in Example I was reslurried in a 400 part beaker. The pH was then adjusted to 7.4 with 10% $H_2SO_4$. An aqueous solution of 2.9 parts of $Na_2Cr_2O_7$ was then added to the slurry and stirred for two hours. The slurry was then flushed as in Example III and tinted as in Example V.

The ink produced in this manner was slightly strong and red in shade as compared with the standard of Example VI. However, it was still weak as compared with the color produced by air oxidation giving products that were green in shade and lacking in strength.

*Example VIII*

Example VII was repeated except that the pH of the slurry was adjusted to 5.2 with 10% $H_2SO_4$. After the sodium dichromate addition, the slurry was heated to 85° C. to effect stronger oxidation. The slurry was stirred for one hour at this temperature. Flushing and tinting were then carried out as above.

The lower pH and heat treatment produced weakness and greenness compared with the product of Example VII. Likewise increasing the strength of the sodium dichromate solution added in the second oxidation gave products that were green in shade and lacking in strength.

*Example IX*

A slurry of partially oxidized ferrous ferrocyanide was prepared as in Example I and 13.8 parts of technical grade 35% hydrogen peroxide were added uniformly over a period of 30–40 minutes by means of a 50 parts burette (160 parts of 35% $H_2O_2$ per 1000 parts pigment on a weight basis). The slurry was stirred 15 minutes after the peroxide addition and filtered. The slurry was then directly flushed and tinted in accordance with the procedure described in Examples III and V.

This ink, when tested against the dry ground ink, made from air-oxidized, dried pigment formed as in Examples II, IV and V, tested 3–4% strong and red in shade. When compared with the flushed one-stage dichromate oxidized ink of Examples I, III and V, it tested 108% strong and red in shade.

The flushed and tinted product was characterized by freedom from grit and pigment agglomerates and was readily dispersible.

It will be seen, therefore, that when employing hydrogen peroxide as the final oxidant in a two-stage wet process, enhanced strength and tinctorial qualities are obtained even when compared with the favored air oxidized pigments of the prior art.

*Example X*

Example IX was repeated with 80, 90, 100, 110, 120, 140 and 160 parts of 35% $H_2O/1000$ parts by weight of pigment. Each slurry was flushed and tinted in accordance with the procedure described in Examples III and V. When the resulting inks were tested against the product formed in Example IX, it was found that when 80 to 100 parts of 35% $H_2O_2$ was used per 1000 parts pigment, the products were 18% to 5% weak based on the product obtained when 160 parts of $H_2O_2$ were used. However, at and above 110 parts 35% $H_2O_2$ per 1000 parts pigment, the color strength of the pigment remained essentially the same, although optimum color development seems to be reached at about 125 parts of the peroxide.

*Example XI*

To an agitated slurry of ferrous ferrocyanide prepared as in Example I, 17.6 parts of 35% hydrogen peroxide per 100 parts of pigment were added uniformly over a period of 30 to 40 minutes by means of 50 ml. burette. Agitation was continued throughout the hydrogen peroxide addition and for an additional 15 minutes after the peroxide addition was completed. The oxidized pigment was filtered off and washed, a yield of 81.6 parts being obtained. The dry content was determined on the above pulp and a sample was flushed and tinted as in Examples III and V. This ink was roughly comparable in strength to the air oxidized control of Example IV, and when compared with the flushed wet process ink produced in Example III, tested 101% strong.

The inks produced by the one-stage operation of this example were characterized by the freedom from grit and pigment agglomerates, and by ease of dispersibility.

*Example XII*

One thousand parts of the press cake of the potassium dichromate oxidized pigment of Example I (3450 parts of pulp at 29.0% solids) were taken and reslurried in an aqueous suspension. A solution of 125 parts of technical grade 35% $H_2O_2$ was added slowly with stirring during a period of one hour. The entire slurry was then flushed in a Patterson ¾ gallon laboratory vacuum mixer in the following proportions:

| | Parts |
|---|---|
| Pigment | 1000 |
| Flushing aid | 50 |
| Technical grade barium chloride | 20 |
| Varnish | 1000 |

The ink produced above tested slightly weaker against the air-oxidized control of Example IV, and 100% strong against the flushed ink produced by direct flushing of the press cake, as in Example III.

*Example XIII*

A slurry of 500 parts by weight of complex ferrous ferrocyanide pigment was produced by reacting sodium ferrocyanide, ammonium sulfate and ferrous sulfate. This slurry was oxidized with 16.5 parts of sodium dichromate in a tank equipped with a single blade agitator. A solution of 63 parts by weight of 35% technical grade hydrogen peroxide was added uniformly over a period of one hour. The slurry was stirred during the peroxide addition and for an additional hour. The slurry was then washed and filtered on a standard plant filter press.

The resultant press cake was then flushed into an ink composition, 500 parts of the pigment (dry basis in the form of the pulp produced above) being treated with the following flushing composition:

| | Parts |
|---|---|
| Flushing aid | 30 |
| Naphthenic mineral oil-ester gum solution | 350 |
| 2,6-di-terbutyl 4-methyl phenol (anti-oxidant) | 1.5 |

The finished ink as produced above was smooth and free flowing, was red in tint shade and approximately 5% strong in color strength compared with the air-oxidized Prussian Blue pigment of Example IV.

*Example XIV*

The procedure of Example XIII was repeated except that before the start of the hydrogen peroxide addition, 5 parts of 2-octanol were added to the pigment slurry. The resulting pigment when flushed as in Example XIII was characterized by a slightly higher color strength.

*Example XV*

Fifty parts of the Prussian Blue pigment was prepared as in Example IX, was introduced into a one-quart pebble mill together with 800 parts of grinding media, 19.5 parts of sodium naphthalene stearosulfonate (Twitchell's Base) and 0.25 part of barium chloride (a preservative). Water was added in sufficient quantity to give a pulp composed of 20% pigment solids. The charge was milled for 18 hours, then removed. A tint was then made by mixing 2 parts of pigment pulp with 100 parts of commercial butadiene-styrene white latex paint.

*Example XVI*

The procedure of Example XV was repeated except that 50 parts of the press cake formed in the procedure of Example I was employed instead of the hydrogen peroxide treated press cake of Example IX.

*Example XVII*

A sample of Prussian Blue pigment made as described in Example II by air-oxidizing a press cake formed in the conventional manner was dried and ground. A 20% pigment pulp was then made from this sample by the milling procedure of Example XV.

*Example XVIII*

When the paint composition containing the pigment produced by hydrogen peroxide treatment of the ferrous ferrocyanide press cake (Example XV) was compared with the air-oxidized and ground pigment of Example XVII, the hydrogen peroxide treated pigment paint composition was found to be 2% strong. When compared with the paint composition obtained by directly flushing a sodium dichromate oxidized press cake (Example XVI) the hydrogen peroxide treated pigment paint composition was found to be 19% strong.

Since additional embodiments and advantages of the invention as disclosed may become apparent to those skilled in the art, it is intended that the invention be limited only by the scope of the appended claims.

What I claim is:

1. In a process for forming Prussian Blue pigment in which a washed Berlin White is made into an ammonium complex in an aqueous slurry and the slurry then oxidized under alkaline conditions, the improvement which comprises completely oxidizing the complex ferrous ferrocyanide to the ferric ferrocyanide by adding hydrogen peroxide to the slurry in an amount equal to at least 75% of the stoichiometric amount required for oxidation of the ferrous iron present in the form of an independent cation in its salts, thereby forming a pigment slurry characterized by the fully developed red shade of Prussian Blue, freedom from grit, and being capable of being flushed directly into paint and ink media without necessity for further color development by elevated temperature air drying and oxidation.

2. The process of claim 1 wherein the alkaline slurry is first partially oxidized with an oxidizing agent other than hydrogen peroxide and the oxidation completed with hydrogen peroxide.

3. The process of claim 1 wherein the alkaline slurry is first partially oxidized with an oxidizing agent selected from the group consisting of sodium dichromate, sodium chlorate and chlorine, and the oxidation of the undried partially oxidized pigment is completed by reaction with hydrogen peroxide.

4. The process of claim 2 wherein the slurry is filtered and the filter cake reslurried in water between the partial and complete oxidation steps.

5. The process of claim 1 wherein the hydrogen peroxide is in a 10% to 65% solution.

References Cited in the file of this patent

UNITED STATES PATENTS

| 2,271,323 | Yee | Jan. 27, 1942 |
|---|---|---|
| 2,271,324 | Yee | Jan. 27, 1942 |
| 2,282,527 | Morrison et al. | May 12, 1942 |
| 2,592,169 | Morrison et al. | Apr. 8, 1952 |
| 2,822,283 | Blaser et al. | Feb. 4, 1958 |
| 2,893,886 | Erskine et al. | July 7, 1959 |

OTHER REFERENCES

Mattiello: "Protective and Decorative Coatings," 1942, vol. II, page 263.

Parle: Official Digest, September 1949, pp. 606–609.